May 29, 1973   R. G. RUSSELL   3,736,116

METHOD AND APPARATUS FOR MANUFACTURING CONTINUOUS FILAMENTS

Filed July 28, 1971   2 Sheets-Sheet 1

INVENTOR.
ROBERT G. RUSSELL
BY
Staelin & Overman
ATTORNEYS

United States Patent Office 3,736,116
Patented May 29, 1973

3,736,116
METHOD AND APPARATUS FOR MANUFACTURING CONTINUOUS FILAMENTS
Robert G. Russell, Granville, Ohio, assignor to Owens-Corning Fiberglas Corporation
Continuation of abandoned application Ser. No. 798,286, Feb. 11, 1969. This application July 20, 1971, Ser. No. 164,441
Int. Cl. C03b 37/02
U.S. Cl. 65—2
24 Claims

ABSTRACT OF THE DISCLOSURE

Apparatus and method for making glass fibers such that molten glass flows to a passageway outlet located at the surface of a porous region and gaseous fluid is supplied under pressure to the porous region, the gaseous fluid being released from the surface of the porous region to promote separation of the molten glass from the surface.

---

This application is a continuation of Ser. No. 798,286, filed Feb. 28, 1969, now abandoned.

BACKGROUND OF THE INVENTION

In the formation of filaments from heat-softened glass it is a practice to flow glass from a supply held in a heated container or bushing through orifices or passageways, in spaced apart projections or tips jutting from the floor of the container to provide at their outlets individual streams of the heat-softened glass. Apparatus associated with the container attenuates the individual streams into continuous filaments and winds bundles of the filaments on a rotating collector, such filaments being attenuated at linear speeds of up to 10,000 or more feet per minute. On initiating attenuation, each of the streams of heat-softened glass emerges as a bead at the outlet end of a passageway. Each bead, upon reaching a weight sufficient to overcome the surface tension of the glass, falls by gravity with a trailing filament.

It has been essential in conventional glass filament forming systems or methods to provide individual or independent orificed projections, each having a passageway in which glass flows. Because the metal of the heated container and its orificed projections must be capable of resisting high temperatures, platinum and platinum alloys are normally used. Because the heat-softened glass emerges at the outlet of each of the projections, the projections tend to isolate the streams and thus impede the heat-softened glass from wetting or flooding the exterior surface of the bottom wall of the heated container or bushing. Although the orificed projections reduce the tendency for the heat-softened glass to flood over the exterior surface of the container bottom wall, the glass at times will flood along the surface with the interruption of filament attenuation.

The art attributes flooding to the tendency of molten or heat-softened glass to wet the surface of the heated container bottom wall, the glass readily spreading over the wetted surface. Bushing construction providing appreciable space between adjacent passageways or projections reduces the tendency of glass to flood.

Modern production demands, however, do not cooperate to alleviate conditions that promote glass flooding. The trend is towards the simultaneous attenuation of a larger number of streams of glass from a single container to provide strands with a larger number of filaments. In such arrangements the adjacent projections must be in close relation to provide the desired number of streams. Because the tendency of the heat-softened glass under such crowded projection conditions to wet the metal surface is greater than its tendency to cohere into a drop or bead formation, a structural arrangement providing closely spaced adjacent projections increases the tendency of the heat-softened glass to migrate or flood along adjacent metal surfaces.

Further, current market demands call for finer glass filaments at economical prices. Such demands mean that in addition to more closely spaced adjacent projections attenuating speeds must increase. The combination of higher speeds of attenuation and finer glass filaments means higher tension along each of the filaments as it is formed.

Moreover, many of the newer glass compositions require higher molten temperatures to provide proper glass fiber forming conditions. Such increase in temperatures produce a marked increase in heat radiation adjacent to the bottom of the container holding the heat-softened glass. Such increase in heat radiation promotes flooding of the heat-softened glass along adjacent metal surfaces.

The increased speeds of filament attenuation promote erratic cooling of the filament attenuation zone. Filaments traveling away from the container holding the heat-softened glass, in a sense, pump ambient atmosphere, e.g. air, away from the filament attenuation zone and thereby introduce uncontrolled cooling effects across the container or bushing bottom. Such cooling contributes to filament diameter variation, an undesirable condition.

Because the container bottom walls are larger, subjected to larger forces and higher temperatures during filament attenuation, the bottom walls tend to deform or sag in a short time. This sag promotes misalignment of the orificed projections and contributes to difficulties such as nonuniform filament dimensions.

SUMMARY OF THE INVENTION

An object of the invention is improved apparatus and method for processing liquid material such as heat-softened fiber forming material.

Another object of the invention is apparatus and method for processing liquid material that flows liquid material to a passageway outlet located at the surface of a porous region, supplies fluid under pressure to the porous region and releases the fluid from within the porous region away from the surface of the porous region to promote separation of the liquid material from the surface and promote localization of the liquid material to the outlet region.

Yet another object of the invention is apparatus and method for processing heat-softened fiber forming material such as molten glass by flowing the material from a supply through passageways extending through a porous wall to emerge at the outlets of such passageways as streams, supplying fluid under pressure to the interior of the porous wall and releasing the fluid from the surface of the wall having the passageway outlets to promote separation of the heat-softened material from the surface and thus substantially preclude flooding of the material on such surface.

Still another object of the invention is apparatus and method for processing heat-softened fiber forming material such as molten glass by flowing the material in a passageway extending through a wall to deliver a stream at the passageway's outlet where at least a portion of the passageway is defined by a surface of a porous region supplying fluid under pressure to the porous region and releasing the fluid from the surface to promote separation of the material from the surface of the porous region in the passageway.

Still another object of the invention is to uniformly establish an environment at the region of the emergence of streams of heat-softened material such as molten glass from a container holding a supply of such material to substantially eliminate or radically reduce the tendency for the material to flood the surface of the container adjacent to the glass streams.

Other objects and advantages will become apparent as the invention is described more clearly hereinafter in detail with reference made to the accompanying drawings.

DESCRIPTION OF THE PREFERRED EMBODIMENTS

While the invention finds particular use in processing molten glass into filaments, one may use the invention in processing liquid material generally and other filament forming material such as nylon, polyester, and the like. Glass is used as an example only to explain the operation of the invention.

Figure 1:
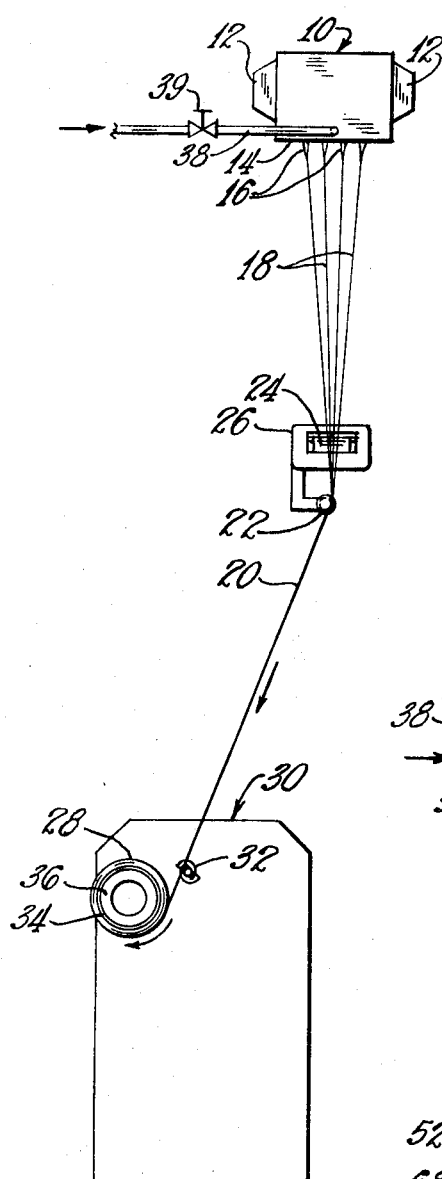
FIG. 1 is a somewhat schematic view in elevation of an arrangement for delivering streams of molten glass from a container and attenuating the streams into filaments according to the principles of the invention.
Figure 2:
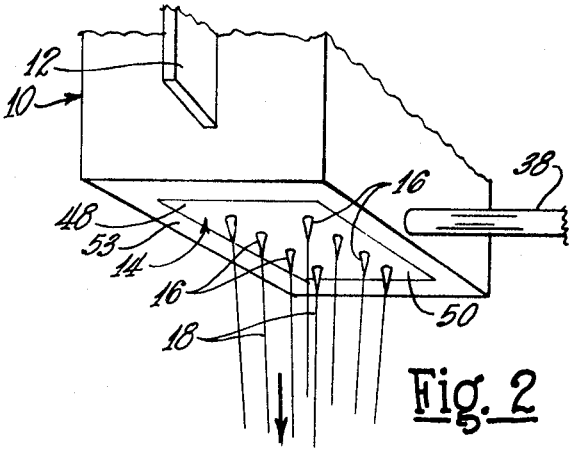
FIG. 2 is an enlarged view in perspective of the container arrangement shown in FIG. 1.

FIGS. 1 and 2 show apparatus for processing molten glass into continuous filament glass strand that collects as a wound package on a collector. Illustrated is a container or bushing 10 that holds a supply of molten glass. The container 10 may connect to a forehearth that supplies molten glass from a furnace or it may connect to a means for supplying glass such as glass marbles, which are reduced to a heat-softened condition in a melter or other means associated with the container 10. Located on the container 10 are terminals 12 that connect to a source of electrical energy to supply heat to the container 10 by conventional resistance heating to maintain the molten glass at a proper filament forming temperature and viscosity. Moreover, the container 10 provides a filament forming zone at bottom wall 14 that includes a plurality of orifices or passageways that deliver streams 16 of molten glass from the container 10.

The streams 16 of molten glass are attenuated in the filament forming zone into individual continuous glass filaments 18 that combine into a strand 20 at a gathering shoe 22 located below the container 10.

An applicator 24 supported within a housing 26 is normally provided to apply sizing or a coating material to the filaments 18. The applicator 24 may be any suitable means known to the art such as endless belt that moves to pass through a sizing or coating liquid held in the housing 26. As the filaments 18 pass across the surface of the applicator 24, some of the liquid on the applicator transfers to them.

The strand 20 collects as a wound package 28 on a winder 30. Strand traversing means 32 moves the advancing strand 20 back and forth along the length of the package 28 as the strand 20 winds on a collector, such as tube 34, telescoped over a spindle or collet 36. The winder 30 appropriately drives the collet 36 in rotation.

Construction of the bottom wall 14 of the container 10 provides for release of fluid from within its structure to its exterior surface where glass is present in the form of the streams 16. A supply tube 38 having a control valve 39 provides fluid, normally a gas, under pressure to the bottom wall 14 from a suitable source. The release of fluid promotes separation of the molten glass from the bottom wall 14.

Figure 3:
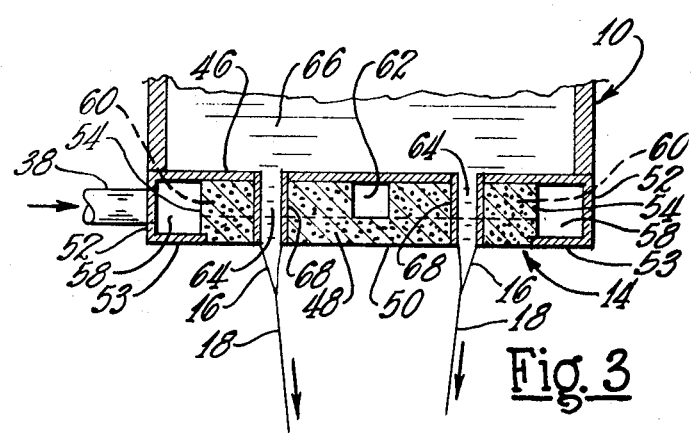
FIG. 3 is a view in transverse section of the container arrangement shown in FIGS. 1 and 2.
Figure 4:
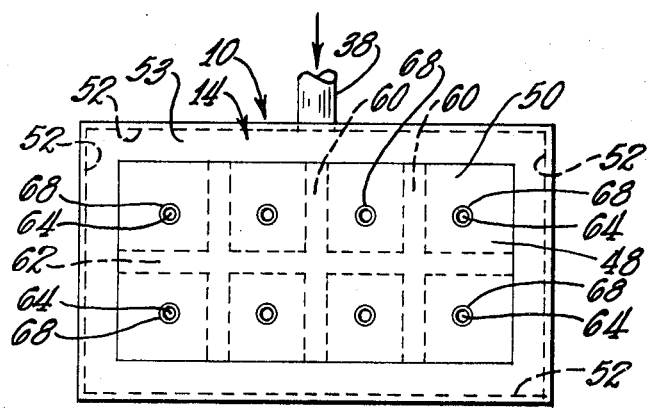
FIG. 4 is a plan view of the bottom wall of the container holding the supply of molten glass shown in FIGS. 1 through 3.

FIGS. 3 and 4 more clearly display the construction of the bottom wall 14, which is a composite unit employing both porous material and nonporous material fashioned to provide a porous region that can release fluid from the exterior surface of the wall 14. A nonporous plate 46 of high heat resistant material such as platinum or an alloy of platinum forms the inside portion or region of the bottom wall 14. Normally a somewhat thicker plate 48 of porous high heat resistant material such as platinum or an alloy of platinum joins to the nonporous plate 46 and forms a porous region with an exterior surface 50 to the bottom wall 14. In the embodiment shown the porous plate 48 has smaller width and length dimensions than the nonporous plate 46, which is fashioned to have side portions 52 and bottom portions 53 cooperating with the edge surfaces 54 of the plate 48 to form a primary fluid passageway 58 perimetering the plate 48. Because the edge surfaces 54 of the plate 48 define part of the wall structure of the primary fluid passageway 58, the pore network of the plate 48 communicates with the primary fluid passageway 58.

In the bottom wall 14 and communicating with the primary fluid passageway 58 is a network of secondary fluid distribution passageways that include passageways 60 running transverse in the plate 48 and a longer passageway 62 extending lengthwise in the plate 48 and intersecting the passageways 60. Because these secondary fluid distribution passageways 60 and 62 are in the plate 48, these passageways communicate with the pore network of the plate 48. Moreover, the primary fluid pasageway 58 and secondary fluid passageway 60 and 62 intersect and are in communication.

Supply tube 38 provides fluid under pressure form a source to the interior of the bottom wall 14 for release at the exterior surface 50 away from the bottom wall 14. The supply tube 38 introduces the fluid into the primary fluid passageway 58 for distribution into the secondary supply passageways 60 and 62, all of which communicate with the pore network of the porous plate 48. The fluid flows internally of the plate 48 by way of the pore network and escapes from the external surface 50 to establish substantially uniform fluid conditions in the filament forming zone.

The bottom 14 also contains a plurality of passageways 64 running through the thickness of the bottom 14 and through which the heat-softened glass flows from a supply 66 held within the container 10 to deliver at their outlets the streams 16 to the exterior surface 50.

Figure 5:
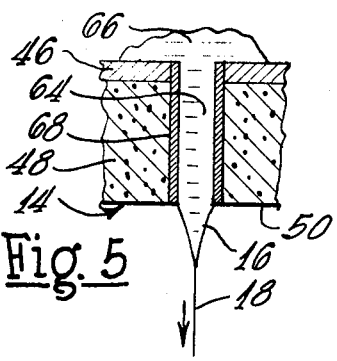
FIG. 5 is a greatly enlarged view in transverse section of a passageway in the container arrangement shown in FIGS. 1 through 4.

As more clearly shown in FIGS. 3 and 5, tubular members 68 of nonporous high heat resistant material, e.g. the material of the nonporous plate 46, extend through the thickness of the bottom wall 14 to define the passageways 64, which are of desired cross sectional dimensions and have a length dimension equal to the thickness of the bottom 14. Since the tubular members 68 are made of nonporous high heat resistant material, fluid from the porous plate 48 does not escape into the passageways 64, The porous structure of the porous plate 48 is normally an open body or sponge like form with a myriad of interconnected pores having a permeability sufficient to flow a desired fluid, usually a gas. Normally the pore size is in the micron range, e.g. from 5 to 165 microns mean pore diameter. The plate 48 usually has a void content from the pore network in the range of from 45 to 55 percent of the plate volume. The porosity of the plate 48 can change with the needs of a particular process.

The movement of a fluid, normally a gas, from the exterior surface 50 of the bottom wall 14 establishes conditions effective to promote levitation or separation of molten glass from the surface 50. Thus, in the initial stages of attenuation release of fluid internally of the porous plate 48 away from the surface 50 promotes beading and substantially precludes flooding of the molten glass on the surface 50. The release of fluid provides fluid energy tending to levitate the molten glass from the exterior surface 50. One can control the volume of fluid released, i.e. fluid energy, from the plate 50 to change the lepitating influence between the surface 50 and the molten glass.

In operation molten glass flows from within the container 10 through the passageways 64 to their outlets located at the external surface 50 of a porous region, i.e. porous plate 48. Fluid under pressure from a suitable source through supply tube 38, the primary fluid passageway 58 and secondary fluid distribution passageways 60 and 62 is supplied interiorly of the porous plate 48. The porous plate 48 releases the fluid from its external surface 50. The released fluid promotes separation of the molten glass from the external surface 50 and thereby localizes the streams 16 to their respective passageway outlet region.

One can supply to and release from the bottom 14 of the container 10 a variety of treating fluids, e.g. air, steam, fluorides such as hydrogen fluoride (HF) and gases that are non-oxidizing in character in combination with a gas or element adsorbable into the material of the plate 48.

In the case of the use of air as the fluid, movement of the air from within the porous plate 48 of the bottom 14 to its exterior surface 50 and away therefrom provides fluid energy or pressure that promotes separation of the molten glass from the surface 50. Moreover, since the air is normally cooler than the molten glass held in the container 10, the air acts as a coolant that reduces the temperature of the exterior surface 50 to considerably less than the temperature at the interior surface of the bottom 14 contacting the molten glass supply 66. The temperature difference or gradient between the interior surface and the exterior surface 50 of the bottom 14 may be as large as 100 to 200 degrees Fahrenheit or more. Such reduced temperature reduces sag in the bottom wall 14.

One may release steam from the exterior surface 50 of the porous plate 48. Steam not only promotes separation of the molten glass from the exterior surface 50 but also penetrates the molten glass streams 16 to reduce their viscosity.

Also, one may release from interiorly of the porous plate 48 an isolating gas mixture including a component of non-atmospheric substantially non-oxidizing character and a component adsorbable into the metal or alloy of the porous plate 48 to provide a region of such gas at the exterior surface 50 that is effective to promote separation of the molten glass from the exterior surface 50. This effect of separating at the molten glass/surface interface is in addition to separation or levitation promoted by fluid energy or pressure through the movement of such gas mixture from the exterior surface 50.

Tests have shown that a gas adsorbable into the metal or alloy of the porous plate 48 provides an interfacial condition resisting wetting of the exterior surface 55 molten glass. One example of successful operating conditions involves the establishment of a non-atmospheric environment where the apparatus of the invention releases from the surface 50 a gas including carbon-dioxide mixed with a small percentage of a hydrocarbon or organic gas such as propane ($C_3H_8$).

It is found that the propane in the non-atmospheric or substantially non-oxidizing environment does not burn; rather, the heat from the container 10 decomposes the propane. The comparatively high temperature, e.g. 2,200 degrees Farenheit or more, at the bottom wall 14 disturbs chemical equilibrium to effect pyrolysis of the propane gas or other decomposible gas, the decomposition products including hydrogen and carbon. It appears that the metal or alloy of the porous plate 48 adsorbs the hydrogen to an extent fostering a separation of the molten glass at the glass/metal interface. The hydrogen appears to provide conditions at the interface resisting wetting of the exterior surface 50 by the molten glass and substantially eliminating or at least greatly reducing the tendency for the molten glass to flood the exterior surface 50 in the region containing the adsorbable hydrogen. The pyrolytic decomposition of the hydrocarbon, i.e. propane, provides carbon in the form of a thin layer or film on the exterior surface 50, which is substantially non-wettable by molten glass and provides an additional factor in the environment reducing the tendency of molten glass to flood the external surface. One may add hydrogen to the gas mixture to reduce or substantially preclude carbon formation.

The conditions in the isolating environment promote a relationship like an increased wetting angle of the molten glass with an adjacent surface, for example, as an angle of 90 degrees to 180 degrees on a platinum substrate, or even a negative adhesion as a pushing of the molten glass from a surface of platinum or platinum alloy.

During bead formation the beads of molten glass tend to acquire a visible deposit or coating of carbon or carbonaceous decomposition product that resists inter-adhesion of the glass beads and promotes a tendency of the beads to remain in indiscreet form.

As soon as the beads of the glass fall and attenuation begins, any carbonaceous decomposition product on the surface of the intensely hot cones or streams of glass 16 instantly combines with atmospheric oxygen upon moving from the isolating or non-atmospheric environment to form water and carbon dioxide gas that dissipates into the atmosphere. This reaction occurs without leaving a contaminant on the filaments 18 drawn from the molten glass streams 16.

The apparatus of the invention releases the gas mixture from the exterior surface 50 of the porous plate 48 at a rate or in an amount that maintains a non-atmospheric or substantially inert environment at the region of the molten streams 16 sufficient to exclude atmospheric oxygen in the zone of the decomposition products. Atmospheric oxygen at the high temperatures adjacent to the container 10 cause the carbon or carbonaceous products to combine with it to form oxides.

It has been found that one may use other gases to provide an isolating, non-atmospheric or substantially non-oxidizing environment at the exterior surface 50. Such gases that have been found satisfactory include nitrogen, helium, argon, neon and xenon where a heat-decomposable hydrocarbon is employed in the environment to provide evolved gas that is adsorbable into the material of the intensely hot open body porous plate 48.

One may use other organic or hydrocarbon gases that decompose under the high temperature influence of the container 10 to result in evolved hydrogen adsorbable into the material of the open body porous plate 48 at such elevated temperatures. Among the organic gases suitable for the purpose other than propane are methane, ethane, butane, isobutane, ethylene, propylene, acetylene, cyclopropane, naphthalene and naphthanes. Because of their ready availability and ability to render the method or process of the invention more economical, such gases as methane, propane and butane are preferred. The organic or hydrocarbon gases are usable in an environment of carbon dioxide.

Another heat-decomposable gas that is useful to promote separation of molten gas from the external surface 50 is anhydrous ammonia ($NH_3$), which readily decomposes into hydrogen and nitrogen at the high temperatures adjacent to the container 10. The evolved hydrogen tends to separate the molten glass from the exterior surface 50. One may successfully use the anhydrous ammonia in an inert or isolating environment provided by argon or other gases such as helium, neon and xenon; however, anhydrous ammonia is not useful in a carbon dioxide environment. The hydrogen resulting from the decomposition of the anhydrous ammonia readily combines with carbon dioxide.

It is found that in order to continue and maintain a non-flooding condition or environment at the exterior surface 50, the gases providing the condition must be delivered substantially continually. Where one uses a hydrocarbon gas, the pyrolytic decomposition products are of fugitive character, and if the inert environment becomes insufficient to exclude oxygen from the stream flow region of the container 10, the decomposition products and oxygen under the high temperatures combine to form oxides, carbon and hydrogen.

It is also found that hydrogen and inert environment such as argon gas, at the temperature in the region of the molten streams 16, is adsorbed by the platinum or platinum alloy of the porous plate 48 and provides an interfacial condition effect tending to separate the molten glass from the surface 50.

The comparatively small percentage of hydrocarbon gases in an inert isolating or non-atmospheric environment is effective to establish interfacial non-wetting characteristics at the exterior surface 50. The percentage of hydrocarbon gas preferably is between ½ percent and 2 percent of the total volume of delivered gases, except methane which should be about 5 percent.

It is found by tests that at higher temperatures well above the attenuating temperatures of glass that the decomposition of the hydrocarbon gas becomes less effective as a non-wetting media. The interfacial condition tending to effect a separation of molten glass from the exterior surface 50 is effective up to a temperature of about 2650 degrees Fahrenheit; about this temperature the effectiveness of the interfacial conditions to reduce flooding substantially lessened. While good results obtain within the usual temperature of molten glass in the container 10, viz between 2200 and 2500 degrees Fahrenheit, it appears that the decomposition of the hydrocarbon gas is more effective in the lower temperature range, i.e. 1400 to 2200 degrees Fahrenheit.

In operation one can combine the character of a fluid as well as the fluid energy or pressure provided by the movement of the fluid from the exterior surface 50 of the bottom wall 14 to establish conditions in the filament forming zone effective to promote levitation or separation of molten glass from the surface 50. Hence, the effect of the fluid energy or pressure provided by the release of a fluid from interiorly of the porous region or plate 48 at its exterior surface 50 may combine with the effect of the character of the fluid itself to enhance the non-wetting characteristics at a filament forming zone. Additionally, one can release fluids from the exterior surface 50 to treat or modify the physical characteristics of the molten glass itself as well as the promotion of separation by the fluid energy provided through movement of the fluid from the exterior surface 50.

Figure 6:
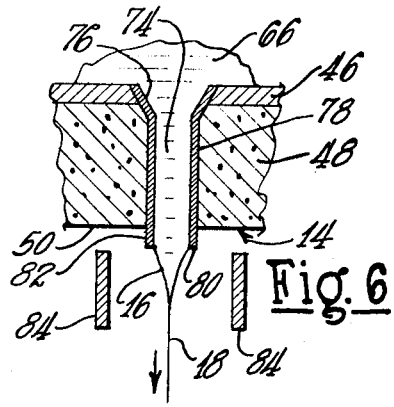
FIG. 6 is a greatly enlarged view in transverse section of a modified passageway construction in the container for flowing streams of heat-softened fiber forming material such as glass according to the principles of the invention.

FIG. 6 shows an enlarged view in transverse section of a portion of a modified container construction according to the principles of the invention. A nonporous tubular member 78 extends through the bottom wall 14 to define a passageway 74 having a tapered entrance portion 76. As in the case of the apparatus shown in FIGS. 1 through 5 the bottom wall 14 includes the joined together nonporous plate 46 and the porous plate 48. The length of the tubular member 78 extends to provide a projection 80 jutting up from the exterior surface 50 of the bottom wall 14. Molten glass from within the container 10 flows through the passageway 74 to provide a stream of molten glass 16 at the outlet of the passageway. The bottom wall 14 includes a plurality of tubular members 78.

As in the case of the apparatus shown in FIGS. 1 through 4, fluid under pressure from within the porous plate 48 is released from the external surface 50. The fluid establishes conditions in the fiber forming zone effective to promote levitation or separation of the molten glass from the surface 50 and from the exterior surface 82 of the projection 80.

One may employ the same types of fluids with the embodiment of FIG. 6 as with the embodiment shown in FIGS. 1 through 5. When one employs a gas mixture having the non-atmospheric component of substantially non-oxidizing character and a component adsorbable into the material of the porous plate 48 and projection 80, the gas mixture forms conditions on both the exterior surfaces 50 and 82 effective to promote separation of the molten glass from these surfaces uniformly in the filament forming zone.

As in the case of the embodiment of FIGS. 1 through 5 the molten streams 16 emerge into ambient conditions at the outlet or delivery end of the passageway. Additionally there is shown means for thermal protection of the streams 16 by barriers such as fin shields 84 running between rows of the orificed projections 80. The fin shields are of the character described in my U.S. Pat. 2,908,036.

Figure 7:
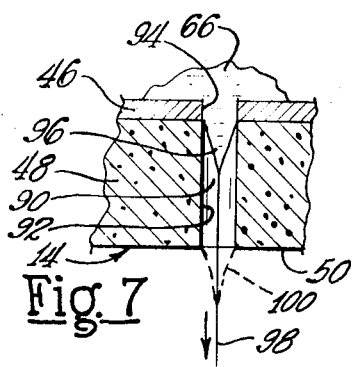
FIG. 7 is a greatly enlarged view in section of another modified passageway in the container for flowing streams of heat-softened fiber forming material such as glass according to the principles of the invention.

FIG. 7 shows an enlarged view in cross section of a portion of another modified container construction, which includes the bottom wall 14 with the joined together nonporous plate 46 and porous plate 48; however, the orifices or passageways providing the streams of molten glass are in communication with the interior pore network of the porous plate 48. FIG. 7 shows one of the passageways, denoted as 90, opening through the thickness of the bottom wall 14. Because the porous plate 48 is shown thicker than the non-porous plate 46, the greater portion of the surface of the passageway wall is defined by the porous plate 48. The reference numeral 92 denotes the portion of the passageway 90 defined by the porous material of the plate 48. The reference numeral 94 denotes the portion of the passageway 90 defined by the non-porous plate 46. Thus, the passageway 90 is in communication with the interior of the porous plate 48 through the pore openings in the surface of the passageway wall portion 92.

As indicated in FIG. 7 the plate 48 releases fluid under pressure supplied to it both from the external surface 50 and from the surface of the passageway portion 92. The fluid introduced into the passageway 90 from the surface of the passageway portion 92 can be of the same character as applied with the embodiment shown in FIG. 1 through 5 and can be released at such a rate or in an amount as to separate the molten glass from the passageway wall surface in the portion 92 and establish molten streams, e.g. molten stream 96, at the interior end of the wall portion 92 located intermediate the ends of the passageway 90. A continuous filament such as continuous glass filament 98 is attenuated from the molten stream 96 within the passageway 90. In operation then, the molten glass as a stream 96 extends into the passageway 90 for only a portion of the passageway length.

As suggested by the dashed lines in FIG. 7, fluid under pressure may be released from the porous plate 48 into the passageway 90 in a manner to treat the molten glass without separating the glass from the surface of the passageway 90 to an extent that a molten stream forms at the outlet of the passageway 90. Under such conditions a molten stream 100, which is indicated in dashed lines, establishes itself at the outlet of the passageway 90. One might introduce an etching agent such as hydrogen fluoride to treat the surface of the glass traveling through the passageway 90 to produce an etched glass filament.

Figure 8:
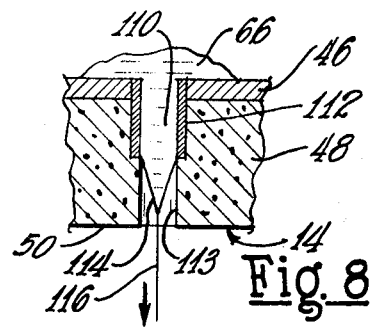
FIG. 8 is a greatly enlarged view in section of another modified passageway in the container for flowing streams of heat-softened fiber forming material such as glass according to the principles of the invention.

FIG. 8 shows yet another enlarged view in cross section of a portion of a modified container construction according to the principles of the invention. A passageway 110 opens through the thickness of the bottom wall 14. A tubular member 112 of non-porous material extends from the entrance of the passageway 110 to terminate at a location intermediate the ends of the passageway 110. Thus, the surface of the passageway 110 includes a portion 113 defined by porous material and a portion formed by the material of the non-porous tubular member 112. The tubular member 112 is similar to tubular members 68 shown in the embodiment of the FIGS. 1–5; however, the tubular member 112 extends only a portion of the length of the passageway 110.

In operation the under pressure fluid supplied to the porous plate 48 escapes both from the external surface 50 and the surface portion 113 of the passageway 110 defined by the porous plate 48. The fluid can be released at such a rate or volume as to establish a stream 114 of molten glass within the passageway 110 similar to the stream 96 shown in FIG. 7. Molten glass flows to the interior end of the tubular member 112 in the passageway 110. The stream 114 extends from the molten glass in the passageway 110 to beyond the end of the tubular member 112. A continuous filament such as a continuous glass filament 116 is formed by attenuation of the stream 114 within the passageway 110. Moreover, as in the case of the embodiment shown in FIG. 7, one can release the fluid from the porous plate 48 at such a rate or volume to permit formation of a stream at the exit of the passageway 110. Under such conditions the fluid may modify the glass surface characteristics but not cause establishment of internal streams such as stream 114.

Figure 9:
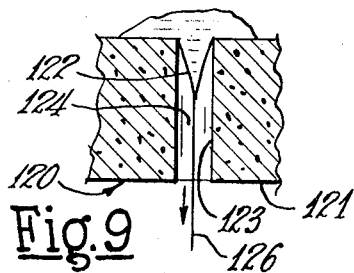
FIG. 9 is a greatly enlarged view in section of another modified passageway in a container for flowing streams of heat-softened fiber forming material such as glass according to the principles of the invention.

FIG. 9 illustrates yet another modified construction of a container according to the principles of the invention where a bottom wall 120 is wholly made of a porous material such as the materials employed with the porous plate 48. In the case of the embodiment shown in FIG. 9 there is no non-porous plate 46. A passageway 124 opens through the thickness of the wall 120 to have its outlet at the wall's external surface 121. Fluid under pressure is released from internally of the porous wall 120 at both the external surface 121 and the surface 123 of the passageway 124. One can release the fluid at such a rate or in an amount as to separate the molten glass from the passageway surface 123 and establish a molten stream 122 at the entrance to the passageway 124. A continuous filament such as continuous filament 126 is attenuated from the molten stream 122.

Figure 10:
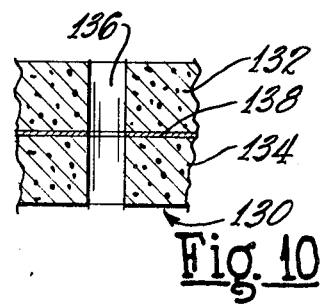
FIG. 10 is another greatly enlarged view in section of still another modified passageway in a container for flowing streams of heat-softened fiber forming material such as glass according to the principles of the invention.

FIG. 10 shows still another enlarged view in cross section of a portion of a modified container construction according to the invention. As shown, a bottom wall 130 comprises two porous plates of different porosity. In the construction shown open body plate 132 forms the inner side of the bottom wall 130 and a porous plate 134 forms the exterior or outer portion of the wall 130, plate 134 being of a more porous nature than the plate 132. The plate 134 can deliver a greater volume of fluid for a given time either through larger pores in the network and/or a larger number of such pores. In the construction of FIG. 10 a thin non-porous plate 138 separates the porous plates 132 and 134. Passageways such as passageway 136 extend through the thickness of the bottom wall 130 for delivering streams of molten glass from the molten glass supply held within the container.

In operation one may employ different fluids to escape from the surface of the passageway 136 at different zones. One might release a fluid into the portion of the passageway 136 defined by the porous plate 134 to separate the molten glass from that portion of the passageway 136 and establish a molten stream within the passageway. Moreover, separate treating fluids might be released in the passageway portion defined by the porous plate 132 to separately affect the surface of the molten glass delivered to the outlet of the passageway 136.

It is apparent that within the scope of the invention modifications and different arrangements may be made other than herein disclosed. The disclosure is merely illustrative, the invention comprehending all variations thereof.

I claim:

1. The method of processing molten glass comprising:
   delivering a stream of molten glass to an orifice outlet located at a surface of a body of porous material;
   supplying a gaseous fluid under pressure to the interior of the body;
   effecting localization of the stream to the outlet region by releasing the gaseous fluid from the surface region embracing the orifice outlet; and
   withdrawing a glass filament from the stream.

2. The method of processing molten glass comprising:
   delivering a filament stream of molten glass to an orifice outlet located at a surface of a body of porous material;
   supplying a fluid under pressure to the interior of the body;
   releasing the fluid in a gaseous state from the surface adjacent to the stream to effectively localize the stream to the outlet; and
   withdrawing a glass filament from the stream.

3. The method of making fibers from inorganic molten fiber forming material comprising:
   delivering a stream of fiber forming material to an orifice outlet located at a surface of a body of porous material;
   supplying a gaseous fluid under pressure to the interior of the body;
   releasing the gaseous fluid from the surface adjacent to the stream, the gaseous fluid and the pressure being such to effectively localize the stream to the outlet region; and
   withdrawing a filament from the stream.

4. Apparatus for making continuous filament glass comprising:
   a container for holding a supply of molten glass, the container including a bottom wall comprising an underlying layer of porous material with a bottom external surface, the bottom wall having at least one outlet passageway therethrough for delivering a stream of molten glass at the external surface;
   means for supplying gaseous fluid under pressure to the interior of the underlying layer of porous material for release at the external surface, the gaseous fluid being supplied under sufficient pressure to localize molten glass to the outlet of the passageway; and
   means for attenuating a continuous glass filament from the stream of molten glass.

5. Apparatus for making continuous filament glass comprising:
   a container for holding a supply of molten glass, the container including a bottom wall comprising an underlying layer of porous material with a bottom external surface, the bottom wall having at least one outlet passageway therethrough for delivering a stream of molten glass at the external surface, fluid supply passageways within the porous material communicating with the pores of the material, the supply passageways being in non-intersecting relationship with the outlet passageway and being in a plane substantially parallel to the external surface;
   means for supplying a gaseous fluid under pressure to the fluid supply passageways, the gaseous fluid being supplied under sufficient pressure to localize molten glass to the outlet of the passageway; and
   means for attenuating a glass filament from the stream of molten glass.

6. The method of processing molten glass comprising:
   flowing molten glass in a passageway extending through a porous layer to deliver a filament stream of molten glass at the passageway outlet located at a surface of the porous layer;

supplying a gaseous fluid under pressure to the interior of the porous layer;

releasing the gaseous fluid from the surface of the layer adjacent the stream to effectively localize the stream to the outlet of the passageway; and withdrawing a glass filament from the stream.

7. The method of processing molten glass comprising;

flowing molten glass in a passageway extending through a porous wall to deliver a filament stream of molten glass at the passageway outlet located at a surface of the porous wall;

supplying a gaseous fluid under pressure to the interior of the porous wall;

releasing the gaseous fluid from the surface of the wall adjacent the stream and promoting localization of the stream to the outlet region of the passageway; and withdrawing a glass filament from the stream.

8. The method of processing heat-softened glass comprising:

flowing heat-softened glass in a passageway extending through a wall to deliver a stream of the heat-softened glass at the passageway outlet located at a surface of the wall, the wall having a porous surface region at least adjacent to the passageway outlet;

supplying a gaseous fluid under pressure to the interior of the porous surface region;

releasing the gaseous fluid from the surface of the porous surface region of the wall promoting separation of the heat-softened glass from the surface; and attenuating a glass filament from the stream.

9. The method of processing molten glass comprising:

flowing molten glass in a passageway extending through a wall having a porous surface region to deliver a stream of the molten glass at the passageway outlet located at the porous surface region;

releasing a gaseous fluid under pressure through the porous surface region of the wall to promote separation of the molten glass from the surface and to promote localization of the stream to the outlet region of the passageway; and attenuating a continuous glass filament from the stream.

10. The method recited in claim 9 where the gaseous fluid is air.

11. The method recited in claim 9 where the gaseous fluid is steam.

12. The method of producing a glass filament comprising:

supplying heat-softened glass to a passageway extending through a wall where at least a portion of the passageway is defined by a surface of a porous region;

supplying gaseous fluid under pressure to the interior of the porous region of the passageway;

releasing the gaseous fluid under pressure from the surface of the porous region of the passageway to promote separation of the heat-softened glass from such surface and establish a stream of heat-softened glass intermediate the ends of the passageway; and attenuating a glass filament from the stream.

13. The method of processing heat-softened glass comprising:

supplying heat-softened glass to a passageway extending through a porous wall;

supplying a gaseous fluid under pressure to the interior of the porous wall;

releasing the gaseous fluid under pressure from the surface of the passageway to promote separation of the heat-softened glass from the surface and establish a stream of the material at the outlet of the passageway; and attenuating a glass filament from the stream.

14. The method of processing heat-softened glass comprising:

delivering a heat-softened glass filament stream to an outlet on a surface of a porous wall;

releasing gaseous fluid under pressure from the interior of the porous wall to the surface of such wall at which the heat-softened glass is present at the outlet in an amount sufficient to establish an environment substantially isolating the surface from the atmosphere and to promote separation of the heat-softened glass from the surface of the wall; and withdrawing a glass filament from the glass filament stream.

15. The method of processing heat-softened glass comprising:

delivering a stream of heat-softened glass to an outlet on a surface of a porous member;

releasing gas under pressure within the porous member from the surface at which heat-softened glass is present at the outlet in an amount sufficient to establish a substantially nonoxidizing environment in the region of the surface and to promote separation of the heat-softened glass from the surface of the wall; and attenuating a glass filament from the stream.

16. Apparatus for processing molten glass comprising:

a porous wall having a passageway opening therethrough;

means supplying molten glass through the passageway to deliver a filament stream of the molten glass to the passageway outlet;

means supplying a gaseous fluid under pressure to the interior of the porous wall, the gaseous fluid being released from the surface of the wall having the passageway outlet effecting separation of the molten glass from the surface; and means for withdrawing a glass filament from the stream.

17. Apparatus as recited in claim 16 where the thickness of the wall includes portions of more than one porosity.

18. Apparatus for processing heat-softened glass comprising:

a wall with a porous surface region on one side, the wall having a passageway extending through it with the passageway outlet located at the surface of the porous surface region;

means supplying heat-softened glass through the passageway to deliver a stream of such glass to the outlet;

means supplying a gaseous fluid under pressure to the interior of the porous wall, the gaseous fluid being released from the surface of the porous surface region, the gaseous fluid promoting separation of the heat-softened glass from the surface and promoting localization of the stream to the outlet region; and means attenuating the heat-softened glass into a continuous glass filament.

19. Apparatus for making filament glass comprising:

a container for holding a supply of molten glass, the container including a bottom wall comprising a porous surface region, the bottom wall having at least one passageway for delivering a stream of molten glass at the external surface of the surface region;

means for supplying a gaseous fluid under pressure interiorly of the porous external surface region, the gaseous fluid being released from the external surface region to promote separation of the molten glass from the external surface and promote localization of the molten glass stream to the outlet region of the passageway; and means for attenuating a continuous glass filament from the stream of molten glass.

20. Apparatus for producing continuous filament glass comprising:
a container for holding a supply of molten glass, one of the walls of the container comprising a non-porous portion and a porous portion joined together, the non-porous portion forming the internal surface of the wall, the porous portion forming the external surface of the wall, the wall having a plurality of orifices extending between the surfaces through which molten glass flows to deliver a stream of molten glass to each of the passageway outlet located at the porous external surface;
means for supplying gaseous fluid under pressure interiorly of the porous portion, the gaseous fluid being released from the external surface to promote separation of the molten glass from the surface and promote localization of the molten glass streams to the outlet region of each of the passageways;
means for attenuating the streams into continuous glass filaments;
means for combining the continuous filaments into a strand; and
means for collecting the strand.

21. Apparatus for processing molten glass comprising:
a container for holding a supply of molten glass, the container including a wall comprising a non-porous portion and porous portion joined together, the non-porous portion forming the internal surface of the wall, the porous portion forming the external surface of the wall, the wall having at least one passageway extending through it in which molten glass flows to deliver a stream of molten glass to the passageway outlet at the external surface;
means for supplying gaseous fluid under pressure interiorly of the porous portion, the gaseous fluid being released at least from the external surface of the porous portion of the wall to promote separation of the molten glass from the external surface and promote localization of the molten glass stream to the outlet region of the passageway; and
means for attenuating a continuous glass filament from the molten glass stream.

22. Apparatus as recited in claim 21 further comprising a non-porous tubular member defining the surface of the passageway.

23. Apparatus as recited in claim 22 where the tubular member extends through the bottom wall and beyond to form a projection on the external surface.

24. Apparatus as recited in claim 22 where the tubular member extends less than the entire length of the passageway.

References Cited

UNITED STATES PATENTS

| | | | |
|---|---|---|---|
| 2,444,731 | 7/1948 | Devol | 65—25 A |
| 3,298,808 | 1/1967 | Macks | 65—25 R |
| 3,345,147 | 10/1967 | Russell | 65—3 |
| 3,374,074 | 3/1968 | Russell et al. | 65—2 |

ROBERT L. LINDSAY, Jr., Primary Examiner

U.S. Cl. X.R.

65—12